G. S. PICKETT.
PORTABLE FENCE.
No. 188,816. Patented March 27, 1877.
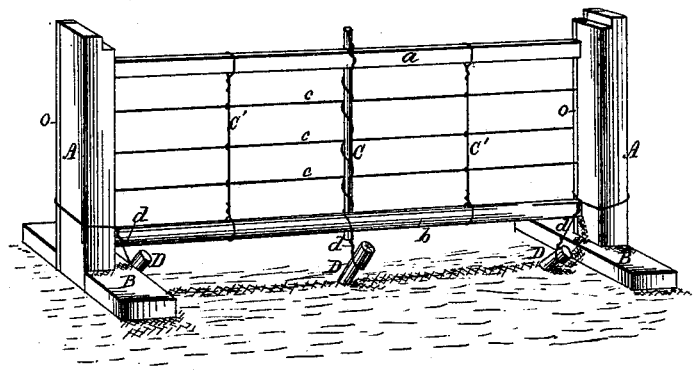
Witnesses
C Clarence Poole
R. D. Smith
Inventor
George S. Pickett.
Per J. B. Woodruff.
Attorney.

UNITED STATES PATENT OFFICE.

GEORGE S. PICKETT, OF PAOLI, WISCONSIN.

IMPROVEMENT IN PORTABLE FENCES.

Specification forming part of Letters Patent No. 188,816, dated March 27, 1877; application filed December 23, 1876.

*To all whom it may concern:*

Be it known that I, GEORGE S. PICKETT, of Paoli, in the county of Dane and State of Wisconsin, have invented certain new and useful Improvements in Fence Board and Wire, and the manner of securing the same to the ground; and the following is a full, clear, and exact description of the same, reference being had to the accompanying drawings, making a part of this specification, in which—

Figure 1 represents a perspective view of one panel of bar and wire fence, showing the manner of constructing the fence, also the posts, and the device for securing the same to the ground.

My invention consists in the construction of farm and yard fences of any suitable material in the manner shown, and securing the same in position by stakes and wires, in the manner hereinafter more fully described, referring to the drawings and the letters thereon.

The posts A A are made of sawed timber, of any desired size, and are cut up the length of about the height of panels of the fence, they being so notched on one side as to fit firmly into the base-blocks B B, set crosswise of the line of the fence. The panels may be made of boards or poles, of any desired length, notched into the posts A A in the usual manner, or a top rail, $a$, and a bottom rail or pole, $b$, may be secured to the posts, and the space between them may be filled in with a series of longitudinal wires, $c\ c\ c$, drawn taut, and secured to the posts A A by nailing cleats $o\ o$ over them, holding the wires on the posts firmly in their places at the proper distance apart; and they may be kept from sagging in the middle by binding a rod, C, onto them, or a wire, $c'$, may be looped around them. The whole panel is held down to the ground by wires $d\ d$ connected with stakes, or pins D D driven on an angle into the ground at the bottom of the fence.

Thus it will be seen that by my method of constructing and setting up a fence no post-holes are to be dug, no heaving or loosening of posts by the frosts, or rotting off, and the pins or stakes are easily replaced or driven in when required.

What I claim as my invention is—

1. The posts A, notched into and firmly secured to base-blocks B, placed at right angles with the line of fence, to which posts the panels, which consist of wood rails $a$ and $b$ and longitudinal wires $c\ c\ c$, are clamped by the cleats $o\ o$, the said posts and panels being firmly secured in place by the wires $d\ d$ and stakes D D driven into the ground, substantially as and for the purposes herein set forth.

2. In combination with the panel the rod and wire C, and the stake D, substantially as and for the purpose described.

In testimony whereof I hereunto subscribe my name to the above specification.

GEORGE S. PICKETT.

Witnesses:
J. B. WOODRUFF,
J. FRED. KELLEY.